Sept. 7, 1965  D. H. BAUMHART  3,205,382
DYNAMOELECTRIC MACHINE

Filed July 1, 1960  2 Sheets-Sheet 1

INVENTOR.
DONALD H. BAUMHART
BY
J. R. Faulkner
K. L. Zerschling
ATTORNEYS

Sept. 7, 1965 D. H. BAUMHART 3,205,382
DYNAMOELECTRIC MACHINE
Filed July 1, 1960 2 Sheets-Sheet 2
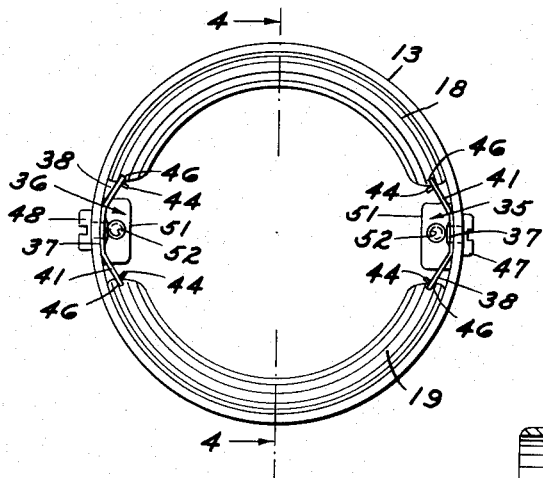
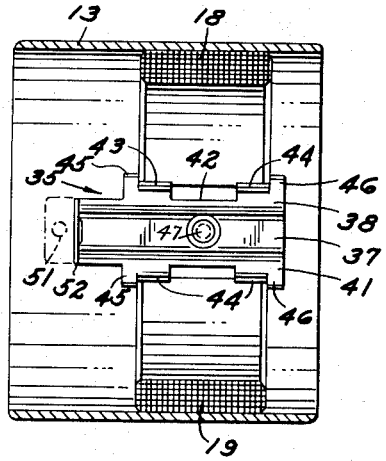
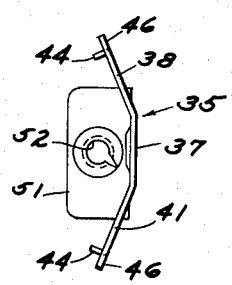
INVENTOR.
DONALD H. BAUMHART
BY
J. R. Faulkner
K. L. Zerschling
ATTORNEYS 3,205,382
DYNAMOELECTRIC MACHINE
Donald H. Baumhart, Livonia, Mich., assignor to Ford Motor Company, Dearborn, Mich., a corporation of Delaware
Filed July 1, 1960, Ser. No. 40,297
5 Claims. (Cl. 310—154)

This invention relates to a dynamoelectric machine and more particularly to a stator structure for a dynamoelectric machine employing a permanent magnet field.

According to the construction of the invention, the dynamoelectric machine includes a stator having a central portion, preferably a cylindrical shell, and an end portion or end cup that rotatably supports the rotor of the machine. A pair of permanent magnets furnish the field for the machine and means are provided, preferably in the form of spring clips, for positioning the permanent magnets within the central portion of the stator. The spring clips are suitably affixed to the central portion, or cylindrical shell, of the stator and means are provided for engaging the end cup and the spring clips for securing the end cup to the central portion or cylindrical shell of the stator. In the preferred form of the invention, each spring clip has a radially inwardly extending flange with an aperture positioned therein, and screws engage the end cup and pass through apertures positioned therein to threadingly engage the apertures in the spring clips.

Thus in the present invention the means for positioning the permanent magnets within the stator also provides a means for securing an end cup of the machine to the central portion of the stator containing the magnets.

An object of the present invention is the provision of an improved and simplified dynamoelectric machine.

Another object of the invention is to provide a novel and improved stator structure for a dynamoelectric machine.

A further object of the invention is the provision of a stator structure for a dynamoelectric machine in which means for positioning a field structure in the stator are also employed to secure together various major components of the stator.

Another object of the invention is the provision of an improved, simplified and inexpensive stator structure for a fractional horsepower dynamoelectric machine.

Other objects and attendant advantages of the present invention will become more readily apparent as the specification is considered in connection with the attached drawings in which;

FIG. 3 is an elevational view of a portion of the stator structure of the dynamoelectric machine;

FIG. 4 is a sectional view taken along the lines 4—4 of FIG. 3, and

FIG. 5 is an end elevational view of a spring clip employed with the present invention.

Figure 1:
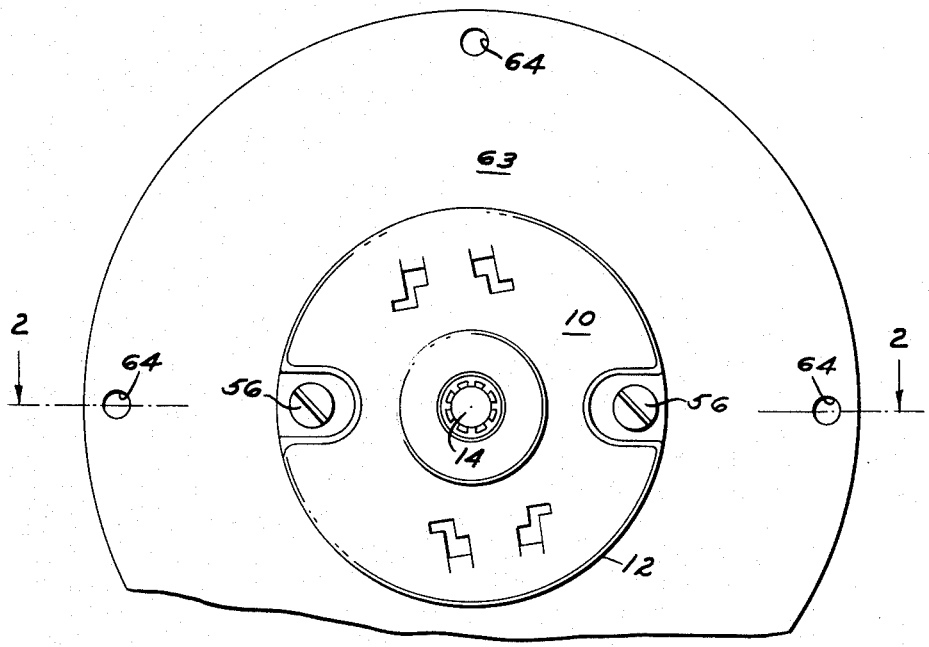
FIG. 1 is an end elevational view of the dynamoelectric machine of the present invention.
Figure 2:
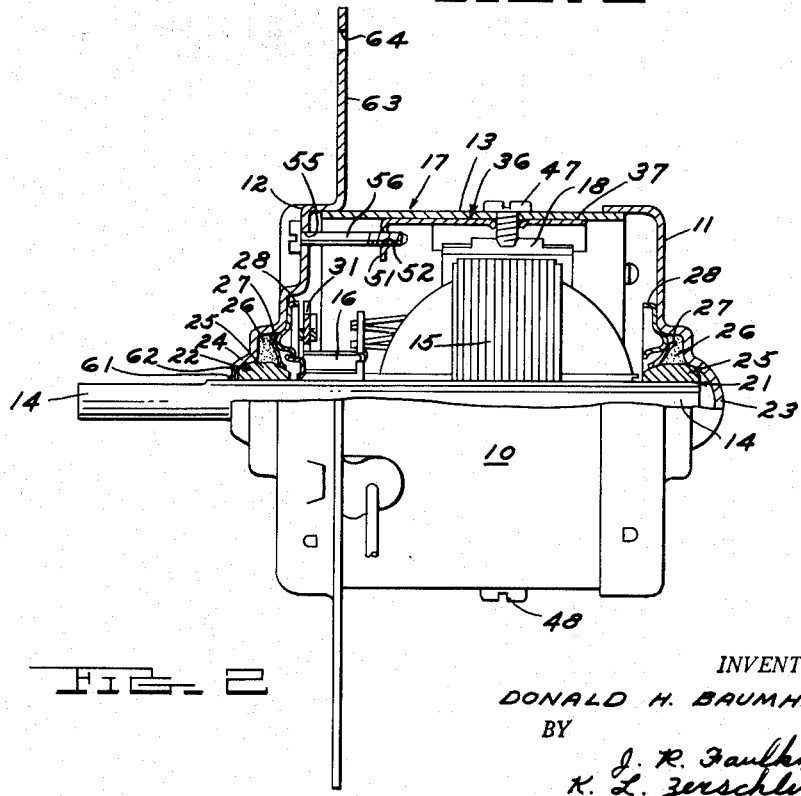
FIG. 2 is a sectional view partially in elevation taken along the lines 2—2 of FIG. 1.

Referring now to the drawings in which like reference numerals designate like parts throughout the several views thereof, there is shown in FIGS. 1 and 2 a dynamoelectric machine, generally designated by the numeral 10, which may be a fractional horsepower commutator type electric motor.

The dynamoelectric machine includes a pair of end cups 11 and 12 affixed to a central portion or cylindrical shell 13 by means to be described subsequently. A conventional rotor assembly comprising a shaft 14, an armature 15, and a current collector member or commutator 16 is suitably mounted for rotation within the stator 17. The stator 17 includes the end cups 11 and 12, cylindrical shell 13, and a permanent magnet field structure which preferably takes the form of a pair of permanent magnets, designated by the numerals 18 and 19 as can best be seen by reference to FIGS. 3 and 4.

The shaft 14 is supported by bearings 21 and 22 that are maintained within recessed end portions 23 and 24 in the end cups 11 and 12. Each of the bearings may have a sleeve 25 of porous material rotatably supporting shaft 14 and a lubricant impregnated packing 26 that surrounds the sleeve 25 so that lubricant may seep through the sleeve to lubricate the shaft. Each sleeve may be retained within the recesses in the end cups by suitable means, for example, an annular resilient bearing spring 27 that engages the sleeve and a spring retainer 28. The spring retainers 28 may be secured to the end cups in any suitable manner, for example, by spot welding.

A rigid sheet of insulating material constructed in the form of a brush card 31 may be positioned within the dynamoelectric machine to hold a pair of electrical contact brushes (not shown) in contact with current collector member or commutator 16. This brush card may be held within the machine by tabs formed integrally with the end cup 12 as shown and described in my copending application Serial No. 40,298, filed July 1, 1960, now Patent No. 3,026,432 and assigned to the assignee of this application.

Referring now to FIGS. 3 and 4, there are shown the permanent magnets 18 and 19 which are supported by means extending around the magnets, preferably in the form of cylindrical shell 13, which is also known as a yoke to those skilled in the art. This cylindrical shell or yoke forms the central portion of the stator 17. The magnets 18 and 19 are preferably of substantially semi-cylindrical configuration and are preferably composed of barium ferrite having the chemical formula $BaO \cdot 6Fe_2O_3$. These magnets have spaced end portions and are mounted within the yoke or cylindrical shell 13 by means of a pair of spring clips, generally designated by numerals 35 and 36. Each of these spring clips has a central portion 37 with flexible means, preferably in the form of a pair of flexible spring legs 38 and 41, extending at an angle from the central portion 37. Each of the flexible spring legs includes a relieved central portion 42 and a pair of tab 43 and 44 extending therefrom at substantially right angles. These tabs are bent from the flexible spring legs so that a small radius is formed between each tab and the remainder of the legs. The flexible spring legs and the tabs engage the permanent magnets at these radii and at a position on the magnets approximately midway between the inner faces and the outer faces. These radii permit relative movement between the edges of the magnets and the flexible spring legs to provide a true spring action. Each flexible spring leg also includes a pair of tongues 45 and 46 positioned on each side of the permanent magnets to secure the permanent magnets in an axial direction with respect to the cylindircal shell or yoke 13.

The central portion 37 of each of the spring clips 35 and 36 is affixed to the cylindrical shell 13 by any suitable means, preferably by means of screws 47 and 48. Each of the spring clips 35 and 36 has a radially inwardly extending flange, designated by the numeral 51, that has a central aperture 52 positioned therein. The end cup 12 has a pair of apertures positioned therein, one of which is designated by the numeral 55 as shown in FIG. 2. A pair of screws 56 and 57 extend through the apertures in the end cup and threadingly engage the apertures 52 of the radially inwardly extending flanges 51.

The spring clips 35 and 36 thus position the permanent magnets 18 and 19 within the cylindrical shell 13. They also furnish means for securing the end cup 12 to the cylindrical shell 13, since the clips are secured to the cylindrical shell 13 by means of screws 47 and 48 and to the end cup 12 by means of screws 56 and 57.

The permanent magnets 18 and 19 are magnetized in a radial direction with the north pole of one of the magnets, for example magnet 18, being positioned on the inner face thereof adjacent the armature 15, and with the south pole being positioned against the yoke or cylindrical shell 13. The other magnet, for example magnet 19, is magnetized in the opposite direction so that the south pole is located along the inner face thereof adjacent armature 15 with the north pole being positioned against the yoke or cylindrical shell 13. Thus, the lines of magnetic flux between the north pole of the magnet 18 and the south pole of the magnet 19 pass directly through the armature 15. The cylindrical shell or yoke 13 is preferably constructed of a material having a low reluctance and it provides a return path for the flux between the south pole of the magnet 18 that is positioned against the cylindrical shell or yoke 13 and the north pole of the magnet 19 which is also positioned adjacent the cylindrical shell 13.

The other end cup 11 may be suitably secured to the cylindrical shell by means of a conventional polymerizing type of cement since no thrust or torsional loads are applied to this end cup. The torsional and thrust loads applied to the stator of the machine by the rotor are all taken by the end cup 12. The rotor is rotably secured in the end cup 12 by means of lock washer 61 and washer 62 that take thrust in a direction toward end cup 11 and by a portion of the spring retainer 28 that engages the commutator 16 and takes thrust in the opposite direction. The end cup 12 includes a large annular extension 63 having a plurality of apertures 64 positioned therein. This large annular extension provides a means for mounting the dynamoelectric machine, thus the end cup 12 takes all torsional loads created as a result of supporting the machine.

Thus, the present invention provides an improved, simplified, and inexpensive stator structure for a dynamoelectric machine in which means for positioning a permanent magnet field structure within the stator are also employed for securing together major components of the stator, such as an end cup and a central magnet supporting structure.

It is to be understood that this invention is not to be limited to the exact construction shown and described but that various changes and modifications may be made without departing from the spirit and scope of the invention, as defined in the appended claims.

I claim:
1. In a stator structure for a dynamoelectric machine the combination comprising, a central portion, a pair of permanent magnets having spaced end portions positioned within said central portion, a pair of spring clips affixed to said central portion and engaging said permanent magnets for positioning said magnets in said central portion, an end cup, and means engaging said end cup and said spring clips for securing said end cup to said central portion.

2. In a stator structure for a dynamoelectric machine the combination comprising, a central portion, a pair of permanent magnets, a pair of spring clips, each of said spring clips having a central portion and flexible portions affixed to said central portion, the central portion of said clips being affixed to the central portion of said stator, said flexible portions engaging said permanent magnets for positioning said permanent magnets in the central portion of said stator, each of said spring clips also having a radially inwardly extending flange, an end cup, and means engaging said end cup and the radially inwardly extending flanges of said clips for securing said end cup to the central portion of said stator.

3. In a stator structure for a dynamoelectric machine the combination comprising, a central portion, a pair of permanent magnets, a pair of spring clips, each of said spring clips having a central portion and flexible spring legs affixed to said central portion, the central portion of said clips being affixed to the central portion of the stator, said flexible spring legs engaging said permanent magnets for positioning said permanent magnets in the central portion of the stator, each of said spring clips also having a radially inwardly extending flange, each of said radially inwardly extending flanges having an aperture positioned therein, an end cup having a pair of apertures positioned therein, and a pair of screws passing through the apertures in said end cup and threadingly engaging the apertures in the radially inwardly extending flanges of said spring clips for securing said end cup to the central portion of the stator.

4. A dynamoelectric machine stator structure comprising a cylindrical shell, an end cup positioned over one end of said cylindrical shell, a pair of permanent magnets positioned within said cylindrical shell and having spaced end portions, a pair of spring clips, each of said spring clips being affixed to said cylindrical shell and having flexible means engaging said permanent magnets for positioning said permanent magnets in said cylindrical shell, an end cup, fastening means engaging said end cup, and means on said spring clips engaging said fastening means for securing said end cups to said cylindrical shell.

5. In a permanent magnet motor, a cylindrical open ended housing, an end member adapted to fit over an open end of the housing, a mounting bolt holding the end member in position, an armature positioned to rotate in the housing, a cylindrical stator including a number of pole segments located in the housing adjacent the armature, a channel member having a bottom and diverging sides wedged between the pole segments to bias the pole segments in position, said channel member extending longitudinally beyond an end of the pole segments and being bent back to prevent longitudinal movement of the pole segments, said mounting bolt being connected to the channel member, whereby said mounting bolt is unaffected by the magnetic field of the armature.

References Cited by the Examiner

UNITED STATES PATENTS

| | | | |
|---|---|---|---|
| 1,411,442 | 4/22 | Leece | 310—89 |
| 1,611,942 | 12/26 | Persons | 310—258 X |
| 2,058,362 | 10/36 | Smalley | 310—259 |
| 2,235,807 | 3/41 | Ballman | 310—42 X |
| 2,513,227 | 6/50 | Wylie | 310—258 X |
| 2,842,692 | 7/58 | Johnson | 310—154 X |
| 2,971,107 | 2/61 | Jin | 310—239 |

FOREIGN PATENTS 229,947  3/44  Switzerland.

OTHER REFERENCES

German application 1,038,171, Sept. 4, 1958 (Kl 21d 45)

ORIS L. RADER, *Primary Examiner.*

DAVID X. SLINEY, MILTON O. HIRSHFIELD,
*Examiners.*